United States Patent

Verjux

[11] 3,913,724
[45] Oct. 21, 1975

[54] DEVICE FOR COLLECTING ELONGATED OBJECTS

[75] Inventor: Jean Verjux, Pavillons-sous-Bois, France

[73] Assignee: Usines Decoufle, Paris, France

[22] Filed: May 16, 1974

[21] Appl. No.: 470,457

[30] Foreign Application Priority Data
May 18, 1973 France .............. 73.18121

[52] U.S. Cl. ............. 198/20 C; 198/25; 198/31 AA; 198/34; 214/1 BS
[51] Int. Cl.² ................. B65G 29/00; B65G 47/52
[58] Field of Search ......... 198/20 C, 25, 31 AA, 34, 198/20 R; 214/1 BS; 131/25

[56] References Cited
UNITED STATES PATENTS

| | | | |
|---|---|---|---|
| 3,026,989 | 3/1962 | Schaltegger | 198/25 |
| 3,039,606 | 6/1962 | Dearsley | 198/25 UX |
| 3,303,926 | 2/1967 | Pohl | 198/25 |
| 3,400,803 | 9/1968 | Lanore | 198/31 AA |
| 3,521,513 | 7/1970 | Gomann et al. | 198/25 |
| 3,567,011 | 3/1971 | Pinkham | 198/25 |
| 3,664,891 | 5/1972 | Schubert et al. | 198/31 AA |

Primary Examiner—Richard A. Schacher
Assistant Examiner—Jeffrey V. Nase
Attorney, Agent, or Firm—Amster & Rothstein

[57] ABSTRACT

The cigarettes are fed by a horizontal, fast-operating rectilinear conveyor and are picked-up by a pick-up plate driven along an elliptic path in a vertical plane tangent to the conveyor. This plate reduces to zero the horizontal velocity of the thus picked-up cigarettes and imparts thereto a vertical downward movement at a velocity equal to the peripheral velocity of a drum revolving about a horizontal axis parallel to the conveyor. The cigarettes are then sucked towards lateral grooves formed in the drum, the latter transferring the cigarettes to another machine or to other subsequent treatment stations.

5 Claims, 8 Drawing Figures

DEVICE FOR COLLECTING ELONGATED OBJECTS

FIELD OF THE INVENTION

The present invention relates to a device for collecting cigarettes or similar elongated objects such as cigarillos, filter-tips, and the like, notably for transferring these cigarettes or like objects from a fast-transport horizontal track to a drum revolving about an axis parallel to said horizontal path.

BACKGROUND OF THE INVENTION

A cigarette-making machine produces a continuous rectilinear rod and then cuts this rod into sections of equal lengths. The rod, then its sections put end to end, are caused to travel along the machine firstly by means of a fast horizontal conveyor, then in a horizontal channel at a speed which, in modern machines may be as high as 5 m/sec. These rod sections of equal lengths, possibly after being separated by a small gap from one another, must subsequently be transferred from the horizontal channel to other machines, notably in a direction perpendicular to that of said horizontal channel, for example vertically. In many cases this transfer takes place by causing these cigarette rod sections of equal lengths to be collected separately or by groups of at least two sections by means of a drum rotating about an axis parallel to said horizontal channel.

In all cases the problem of reducing the horizontal velocity of translation of each section to zero without damaging this section arises and must be solved without any loss of tobacco from the ends of each section, whereafter a suitable velocity must be impressed to the thus stopped section but in the selected perpendicular direction; besides, the change of movement of each section must take place at a predetermined point in space with a high degree of precision.

A cigarette-collecting device of the type mentioned hereinabove has already been constructed. It comprises a movable pick-up head, means for moving said pick-up head along a closed-circuit path tangent to the horizontal path across a pick-up station, said closed-circuit path extending in a vertical plane tangent to a generatrix of said rotary drum, at the level of a distributing or dispensing station. In this known arrangement the means for actuating the pick-up head are so disposed that the closed-circuit path followed by this head is an epicycloidal curve. It is obvious that this result cannot be obtained unless a mechanism comprising a relatively great number of toothed pinions and wheels in mutual meshing is used. The assembly is wherefore very expensive and noisy, due notably to its necessarily high operating speed consistent with that of said cigarette sections travelling along said horizontal path.

SUMMARY OF THE INVENTION

It is the essential object of the present invention to avoid the above-mentioned inconveniences by providing a device for collecting cigarettes and similar elongated objects, which, while being of the type broadly set forth hereinabove, is characterised in that the means for actuating said pick-up head are so arranged that its closed-circuit path has the shape of an ellipse having a horizontal major axis with one end of the major axis located at said dispensing station.

With this arrangement, the collector device according to this invention may be constructed by using mechanical component elements considerably simpler than those constituting the prior art device mentioned hereinabove. Therefore, the device of this invention is considerably more economical and less noisy at the high speed values required for an efficient operation.

Preferably, the means for actuating said pick-up are disposed according to this invention, with a view to impart thereto, at the end of its minor axis, a linear velocity parallel and equal to that of the cigarette sections travelling along said horizontal feed path, and at the end of its major axis, a linear velocity parallel and equal to the peripheral velocity of said rotary drum.

In a preferred form of embodiment of the cigarette collector device of this invention the pick-up head comprises in the vertical plane tangent to one generatrix of said rotary drum a pick-up plate comprising at least one cigarette receptacle, a pair of identical crankshafts having their main shafts disposed at right angles to said vertical plane, said pick-up plate being pivotally mounted on the crankpins of said crankshafts, driving means being provided for simultaneously driving the main shaft of each crankshaft with a predetermined throw $R_1$ about a fixed axis perpendicular to said vertical plane, and its crankpin with another predetermined throw $R_2$ about the axis of said crankshaft, at rotational speed equal and in opposite directions, whereby said pick-up plate cigarette receptacle be kept in horizontal position at all points of its elliptic path. Preferably, the main shafts or axes of said crankshafts are mounted for eccentric rotation on plates or cases also rotatably mounted, to which synchronous movements of rotation about fixed axes parallel to said crankshaft axes are imparted, said fixed axes being both disposed in a common horizontal plane.

According to another advantageous feature of the collector device of this invention an accelerator is disposed at a suitable point of the horizontal transport path for separating the cigarettes fed in end-to-end relationship for example from the cutter, said accelerator consisting for example essentially of a pair of cams having the shape of semi-circular segments and revolving about vertical axes, the relative spacing and the peripheral velocity of these cams being such that the cigarette sections are slightly pinched therebetween and thus accelerated.

BRIEF DESCRIPTION OF THE DRAWINGS

Several forms of embodiment of the cigarette collecting device according to this invention will now be described by way of example with reference to the attached drawings, in which.

DESCRIPTION OF THE PREFERRED EMBODIMENT

Figure 1:
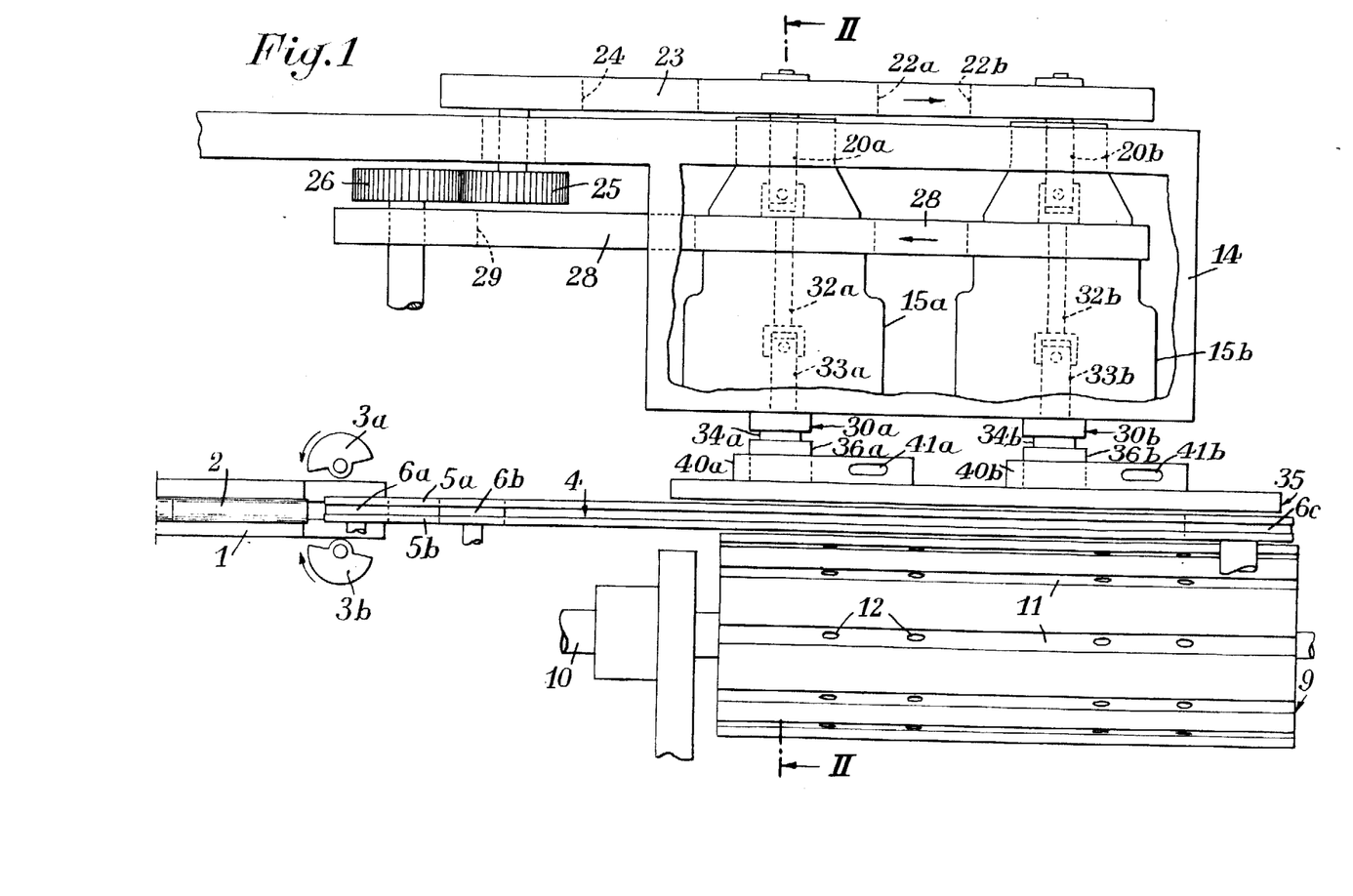
FIG. 1 illustrates diagrammatically in plane view with parts broken away a first form of embodiment of the collector.
Figure 2:
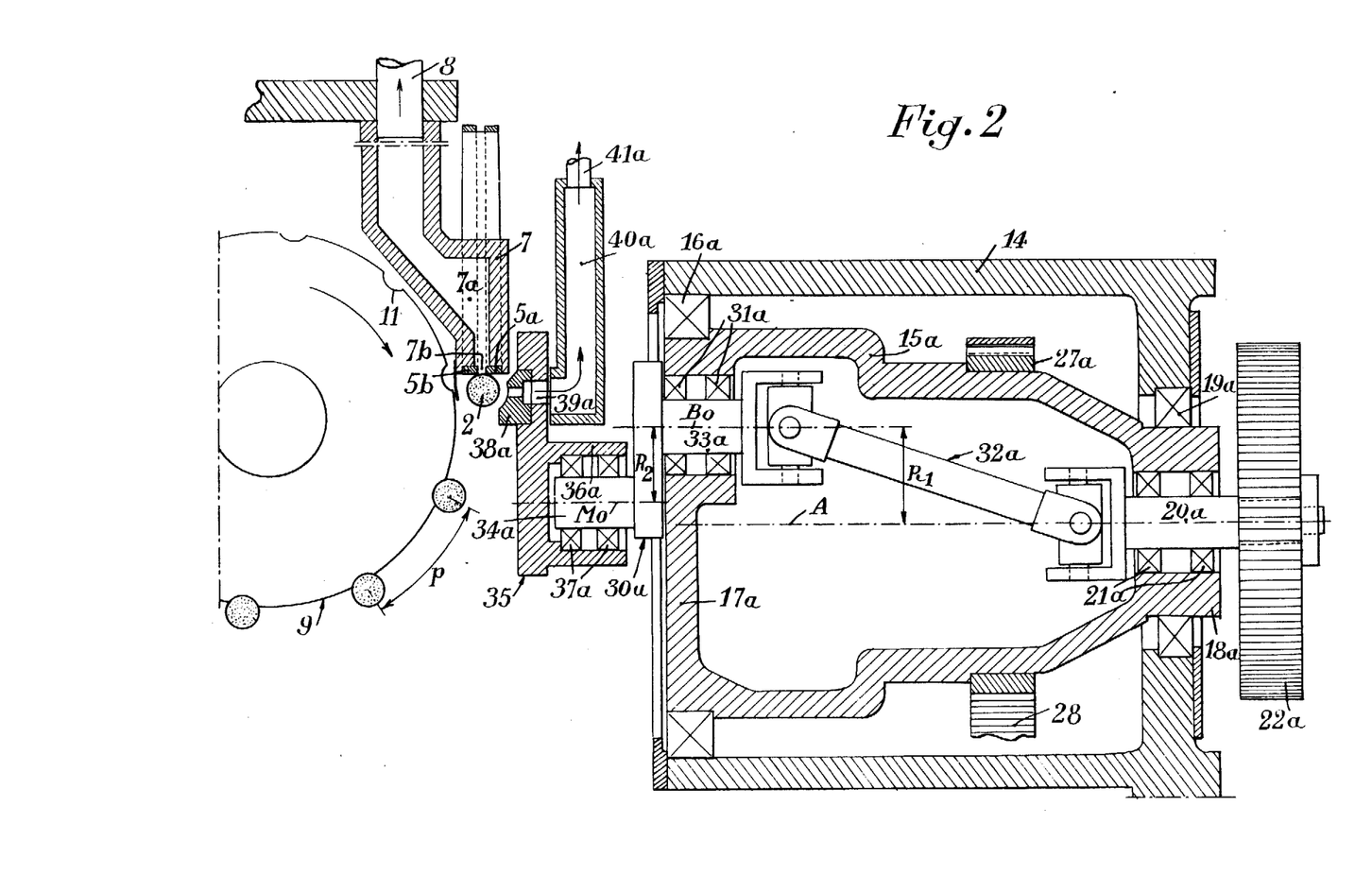
FIG. 2 is a section taken along the line II—II of FIG. 1.
Figure 3:
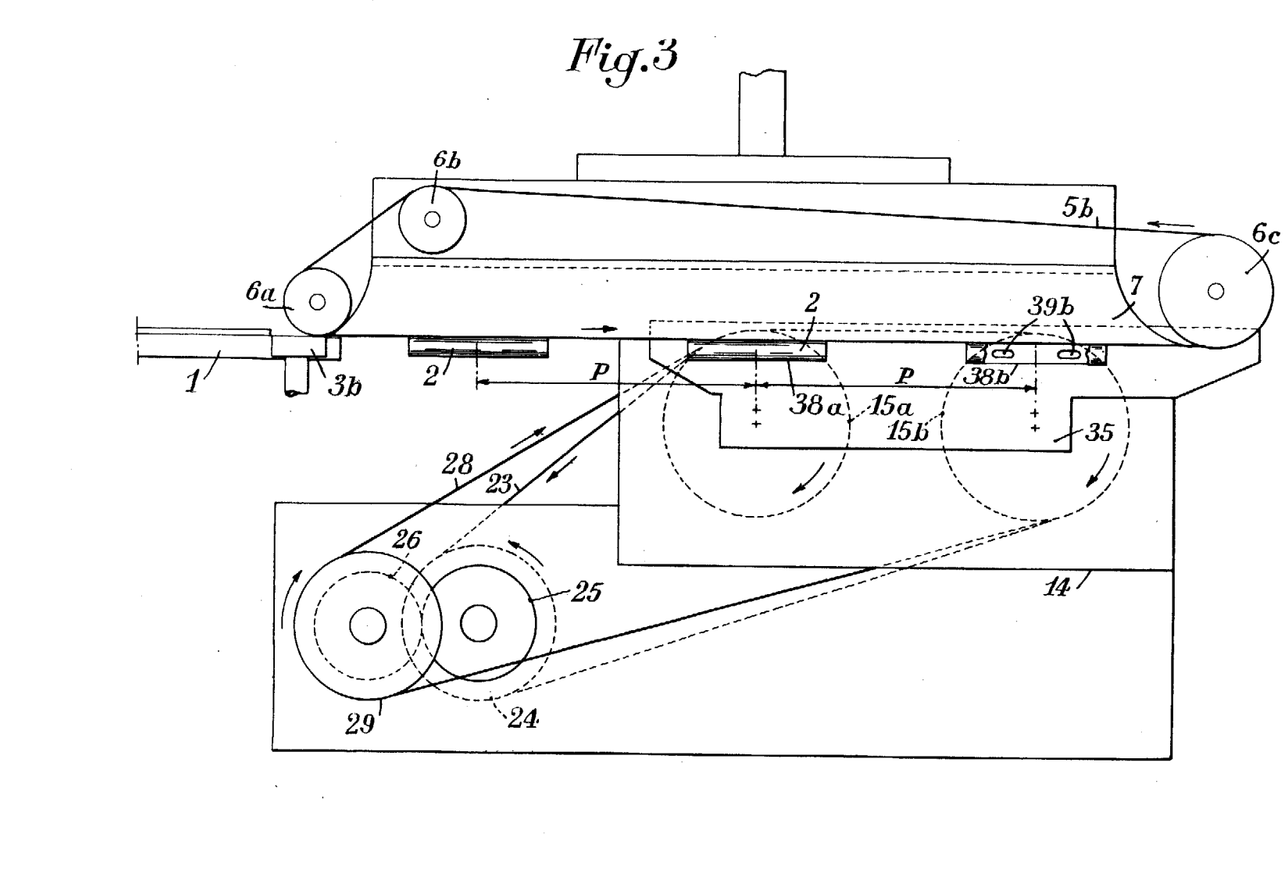
FIG. 3 is an elevational view of the device of FIGS. 1 and 2, the rotary collector drum being removed therefrom.

In FIGS. 1–3 of the drawings the reference numeral 1 designates the downstream end of a horizontal channel, trough or chute in which the cigarettes such as 2, disposed in end to end relationship travel to the right, as seen in these Figures. A pair of disc-shaped cams 3a and 3b having the shape of semi-circular segments are disposed on either side of the right-hand end of the horizontal channel 1 (see FIGS. 1 and 3), respectively. These cams 3a and 3b are rigid with vertical shafts rotatably driven from the power mechanism (not shown) of the machine through transmission members so dimensioned and in such relationship that the cams 3a and 3b rotate in synchronism, whereby the linear velocity of these cams, measured parallel to said channel 1, be considerably higher than the linear feed velocity of the cigarettes 2, for example twice this cigarette speed. Thus, each cigarette 2 moving between the two cams 3a and 3b is driven thereby at a speed considerably higher than that of the next cigarette upstream in said horizontal channel 1, so as to form a predetermined gap between any two successive cigarettes. These are subsequently deposited by the accelerator 3a, 3b upon the left-hand end (FIGS. 1 and 3) of a horizontal conveyor 4 aligned with the horizontal channel 1. In the form of embodiment contemplated herein this horizontal conveyor 4 comprises essentially a pair of parallel endless belts 5a and 5b guided and driven by means of twin-grooved pulleys 6a, 6b and 6c. As clearly shown in FIG. 2, the lower run of these belts 5a and 5b are guided in corresponding grooves formed in the bottom face of an elongated casing comprising an elongated inner chamber 7a communicating with the surrounding atmosphere through a relatively narrow slot 7b opening into the gap formed between the lower runs of the pair of belts 5a and 5b. This chamber 7a is connected on the other hand to a source of vacuum (not shown) via a pipe 8. It is clear that the successive cigarettes 2 are urged by the suction thus created through the slot 7b against the lower faces of the lower runs of belts 5a and 5b, so that these cigarettes are conveyed to the right as seen in FIGS. 1 and 3. During this travel, the relative spacing of the successive cigarettes, due to the preceding action of accelerator 3a, 3b, is maintained, so that the relative positions of the cigarettes remain unchanged during their transfer, their middle points being separated by a predetermined distance or pitch P greater than the length of each cigarette.

On one side of the right-hand portion (as seen in FIGS. 1 and 3) of the horizontal conveyor 4, a collector drum 9 (not shown in FIG. 3) is rotatably mounted about a shaft 10 parallel to the direction of horizontal conveyor 4 and in such position that the lateral surface of this collector drum 9 moves in close proximity of the lower runs of belts 5a and 5b of conveyor 4, as shown in FIG. 2. This lateral or cylindrical surface of drum 9 has formed therein spaced longitudinal grooves 11 of part-circular cross-sectional configuration, these grooves 11 being disposed at a relative pitch p (FIG. 2). Opening into the bottom of each groove 11 is one or preferably a plurality of orifices 12 connected by passages (not shown) formed in the rotary drum 9 and along its rotary shaft 10, as well as in a suitable bearing (not shown) to said source of vacuum.

In the form of embodiment illustrated the length of the rotary drum 9 is considerably greater than P, and preferably of the order of 2 P, so that two cigarettes 2 can be transferred simultaneously into its grooves 11 moving past the horizontal conveyor 4, as will be explained presently more in detail.

On the other side of said right-hand portion (in FIGS. 1 and 3) of said horizontal conveyor 4, with respect to said rotary drum 9, a casing 14 of a length approximating that of drum 9 is provided. The face of casing 14 which registers with said conveyor 4 comprises two circular apertures in which a pair of corresponding casings 15a and 15b are mounted for free rotation by means of ball-bearings such as 16a (FIG. 2). In the form of embodiment contemplated herein each casing 15a, 15b has a front portion constituted by a circular plate such as 17a (FIG. 2) and a rear, frustoconical portion formed with a cylindrical journal portion 18a extending through a circular aperture at the rear end of casing 14. This cylindrical journal 18a is rotatably mounted in said circular rear aperture by means of a ball-bearing such as 19a. Moreover, the central bore of this bearing 19a receives a shaft such as 20a journalled therein by means of ball-bearings such as 21a. Keyed to the end of the shaft 20a which projects from the casing 14 beyond said bearings 21a is a notched pulley 22a. As shown in plane view in FIG. 1, the pair of notched pulleys 22a and 22b are rotatably driven by means of a common cogged belt 23 from a third notched pulley 24 driven in turn from the power mechanism of the machine (not shown) via a transmission system of which only a pair of pinions 25 and 26 are shown in FIG. 1, with a ratio selected in a manner to be explained presently.

Wedged to the outer surface of the central portion of each casing such as 15a (FIG. 2) is a notched ring 27a, and the notched rings of the pair of parallel casings 15a and 15b are rotatably driven by means of a common cogged belt 28 emerging from the casing 14 through suitable slots (not shown) formed in the walls thereof, this belt being driven in turn by means of another cogged pulley 29 wedged or keyed to the shaft supporting the pinion 26 of the above-described transmission, so as to rotatably drive the casings 15a, 15b on the one hand and the corresponding shafts 20a, 20b, on the other hand, at equal speeds but in opposite directions.

A crankshaft such as 30a (FIG. 2) having a throw $R_2$ has its main shaft mounted for free rotation by means of a ball-bearing 31a in a circular aperture of the corresponding front circular plate 17a, said aperture being somewhat eccentric in relation to this plate 17a by an amount or throw $R_1$ greater than $R_2$. A double universal or Hooke's joint transmission 32a is inserted between the inner end of shaft 20a, on the one hand, the inner end of the shaft 33a of said crankshaft 30a, on the other hand.

The corresponding crankpins 34a and 34b of crackshafts 30a and 30b, which extend horizontally like the axes of the rotary casings 15a and 15b support a pick-up plate 35 extending parallel to the vertical plane tangent to the lateral surface of said rotary drum 9. The face of said pick-up plate 35 which registers with the casing 14 has a pair of tubular projections 36a and 36b formed thereon and so disposed that the corresponding crankpins 34a and 34b of crankshafts 30a and 30b, which are timed to remain constantly parallel and equally spaced from each other, can rotate freely in said cylindrical extensions with the assistance of ball-bearings such as 37a.

The face of the pick-up plate 35 registering with the rotary drum 9 comprises two cigarette-receiving receptacles 38a and 38b (see FIGS. 2 and 3) with a relatively spacing P. On the other hand, the pick-up plate 35 has formed therethrough at the level of each cigarette receptacle, for example 38a (FIG. 2) a suction port 39a opening into a box such as 40a connected in turn by means of a pipe 41a to the vacuum source already mentioned in the foregoing.

The assembly is so disposed that when the two cigarette receptacles 38a and 38b pass just beneath the lower runs of belts 5a and 5b of horizontal conveyor 4, the corresponding suction port of the pick-up plate, for example 39a, registers with the horizontally elongated opening of the relevant vacuum chamber for example 40a, and then moves in front of this opening the entire second half of the movement of said pick-up plate 35 from left to right as seen in FIGS. 1 and 3, as a result of the synchronous movement of crankshafts 30a and 30b, as will be explained more in detail presently.

Figure 4:
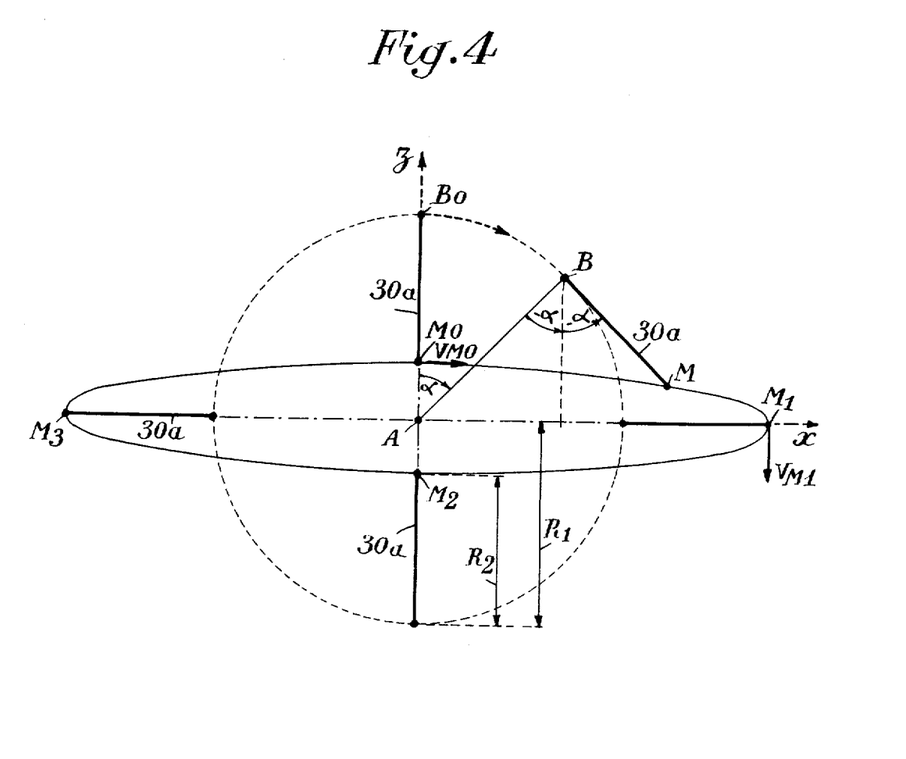
FIG. 4 is an explanatory diagram for facilitating the understanding of the mode of operation of this first form of embodiment.

The above-described form of the embodiment of the device constituting the subject-matter of the present invention operates as follows:

The plane of the diagram of FIG. 4 is perpendicular to the axis A of the rotary casing 15a (FIG. 2). In this diagram $B_o$ denotes the upper portion of the path formed on this plane by the axis of crankshaft 30a which, as a consequence of the rotational movement imparted to said rotary casing 15a by the transmission belt 28, describes a circle of radius $R_1$ in the clockwise direction. On the other hand, Mo designates the path of the crankshaft 34a when the axis of this crankpin is plumb to Bo, i.e., at a distance $R_2$ beneath this last-mentioned point. Let $\omega$ 1a be the algebraic value of the angular velocity of rotation imparted by the cogged belt 28 and notched ring 27a to said rotary casing 15a, and consequently to the main shaft 33a of crankshaft 30a, at a subsequent time $t$ this axis 33a will have rotated in the clockwise direction through an angle $\alpha = \omega t$, so as to move to point B; therefore, due to the absolute angular velocity of rotation imparted to the mainshaft 33a of crankshaft 30a by the transmission mechanism comprising the members 22a, 20a and 32a, at said time $t$ the crankshaft 30a will have rotated in relation to the vertical through an angle $-\alpha = -\omega t$ in the counterclockwise direction, whereby the axis of its crankpin 34a will eventually move to point M.

With respect to the two axes of orthogonal coordinates, Az and Ax, the coordinates of this point M are:

$$\begin{cases} Z = R_1 \cos\alpha + R_2\cos(\pi-\alpha) = (R_1-R_2)\cos\alpha \\ X = R_1\sin\alpha + R_2\sin(\pi-\alpha) = (R_1-R_2)\sin\alpha \end{cases} \quad (1)$$

By removing $\alpha$ from these two relationships, the path followed by the crankpin axis M of the crankshaft 30a can be converted into the following equation:

$$\frac{Z^2}{(R_1-R_2)^2} + \frac{X^2}{(R_1+R_2)^2} = 1, \quad (2)$$

which proves that this path is an ellipse having its major axis (of which the half-length $R_1 + R_2$ aligned along Ax) disposed horizontally, the minor axis of said ellipse (of which the half-length is $R_1 - R_2$ being vertical. Since the two crankshafts 30a and 30b are timed to remain constantly parallel, the axes of their crankpins describe two identical ellipses in the vertical plane concerned, and the same applies of course to all points of said pick-up plate 35, therefore more particularly to its cigarette receptacles 38a and 38b.

From the above formulae (1) it is clearly apparent that the linenr velocities of the crankpins of the pair of crankshafts, at the apices $M_o$ and $M_2$ of its minor axis and at the apices $M_1$ and $M_3$ of its major axis, are horizontal and vertical, and have the following values, respectively:

$$\begin{cases} V_M = (R_1 + R_2) \cdot \omega \\ V_M = (R_1 - R_2) \cdot \omega \end{cases} \quad (3)$$

The transmissions interposed between the driving motor (not shown) of the machine, on the one hand, the rotary casings 15a, 15b and crankshafts 30a, 30b on the other hand, are so dimensioned according to this invention that the linear velocity $V_{Mo}$ is imparted to the apices of the minor axis of their elliptic path, which is parallel and equal to that of the horizontal conveyor 4, and that the linear velocity $V_{M1}$ is imparted to the apices of their major axis, parallel and equal to the periphery of said rotary drum 9, respectively. If N is the number of cigarettes transported per time unit by the horizontal conveyor 4, the above relationships (3) permit of converting the above-mentioned conditions into the following form:

$$\begin{cases} (R_1 + R_2) \omega = PN \\ (R_2 - R_1) \omega = P \dfrac{N}{2} \end{cases} \quad (4)$$

Since each complete description of its elliptic path by the crankpin of each one of said pair of crankshafts 30a and 30b corresponds to the transfer of two cigarettes, we obtain:

$$\omega = 2\pi \frac{N}{2} \quad (5)$$

From the above formulae (4) and (5) the dimensions of each rotary casing 15a, 15b and of its crankshaft can be obtained as follows:

$$\begin{cases} R_1 = \dfrac{P}{2\pi} + \dfrac{P}{4\pi} \\ R_2 = \dfrac{P}{2\pi} - \dfrac{P}{4\pi} \end{cases} \quad (6)$$

Figure 5:
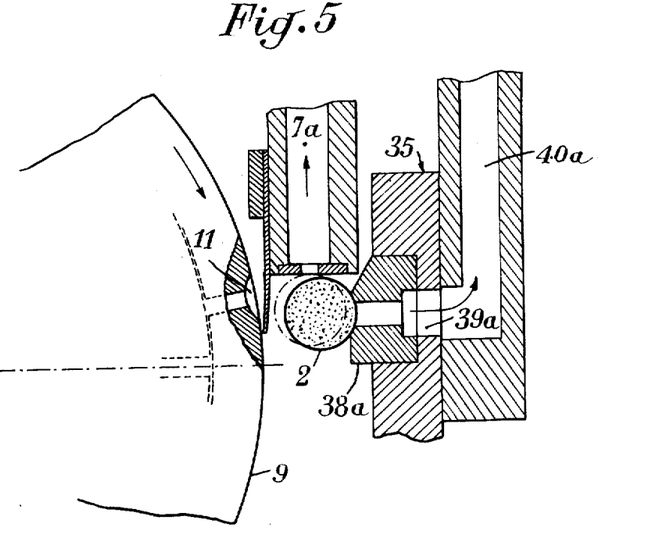
FIGS. 5 and 6 are diagrammatic views showing on a larger scale two successive steps of the cigarette transfer operation according to this first form of embodiment.

In FIG. 2 the cigarette 2 sucked through the slot formed between the lower runs of the pair of cogged belts 5a and 5b of horizontal conveyor 4 is carried along by this conveyor to the right, as seen in FIGS. 1 and 3; in FIG. 5, the various elements are shown in the positions obtained a short time afterwards, when all the points of pick-up plate 35 and notably it cigarette receptacle 38a are at the top dead centre of their elliptic path. At that time, the cigarette 2 is sucked towards the receptacle 38a through the suction port 39a then registering with the corresponding opening of vacuum box 40a. This transfer is permitted by the fact that this vacuum box 40a produces a greater suction than the vacuum box 7a, and takes place very smoothly due to the equality between the horizontal linear velocities of conveyor 4 and pick-up plate 35 at the time concerned.

Due to the elliptic movement accomplished by the receptacle 38a holding a cigarette 2 (along the elliptic arc ($M_0 - M_1$ of FIG. 4), the linear horizontal velocity of said cigarette 2 driven by the pick-up plate 35 is reduced very gradually, said plate 35 gradually imparting an increasing vertical linear velocity to the cigarette 2.

Figure 6:
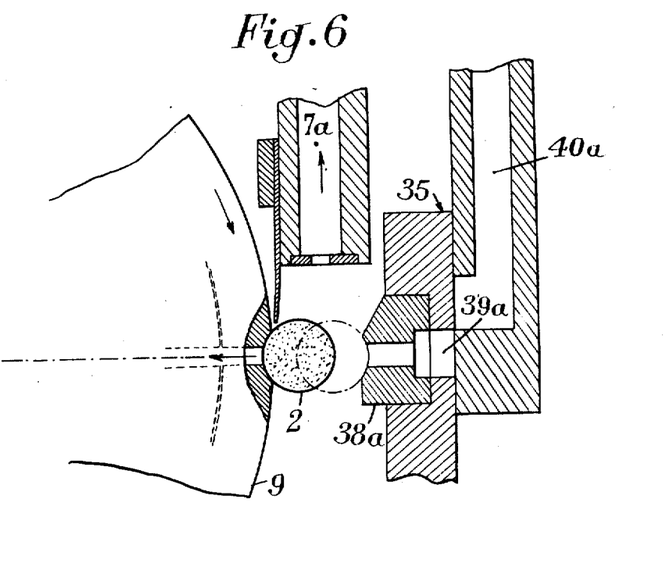

FIG. 6 corresponds to the time when the receptacle 38a and the cigarette 2 conveyed thereby are at the top dead centre $M_1$ (FIG. 4) of their elliptic path, with zero horizontal linear velocity and maximum vertical linear velocity. At that time, the suction port 39a is no more communicating with the vacuum box 40a, due to the throttle-valve effect produced by the pick-up plate 35 movable in relation to said fixed box 40a, so that the cigarette 2 is no more sucked through said pick-up plate 35. Now as this cigarette registers with a peripheral groove 11 of the rotary drum 9, it is sucked immediately, and this new transfer also takes place very smoothly, since the horizontal linear velocity of the cigarette 2 is then reduced to zero while a downward movement is imparted thereto, at a vertical velocity substantially equal to the peripheral velocity of the rotary drum.

In the specific case of the embodiment contemplated hereinabove, the transfers illustrated in FIGS. 5 and 6 take place simultaneously for the pair of cigarettes registering with the receptacles 38a and 38b, respectively, of pick-up plate 35.

Figure 7:
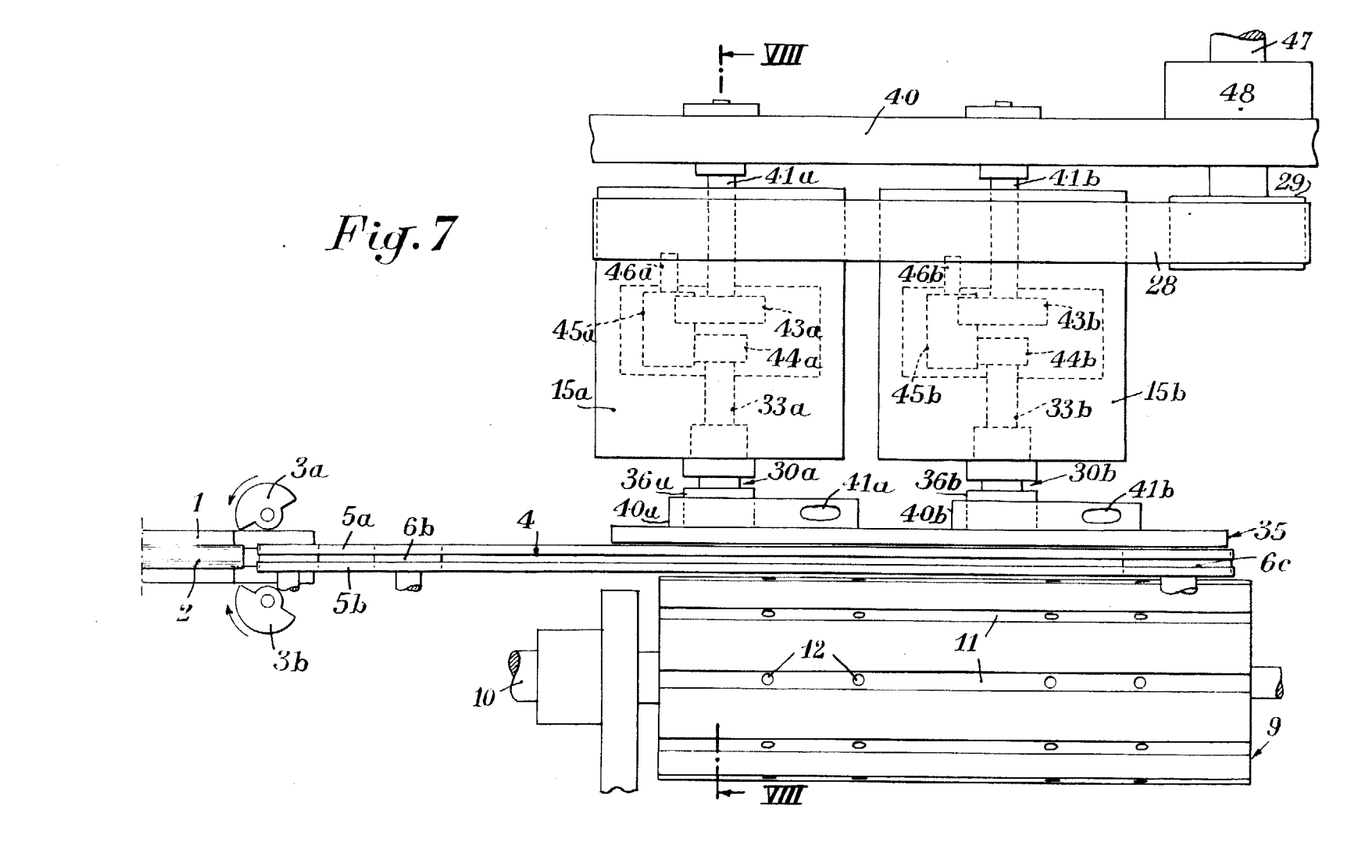
FIG. 7 is a plane view with parts broken away showing another form of embodiment.
Figure 8:
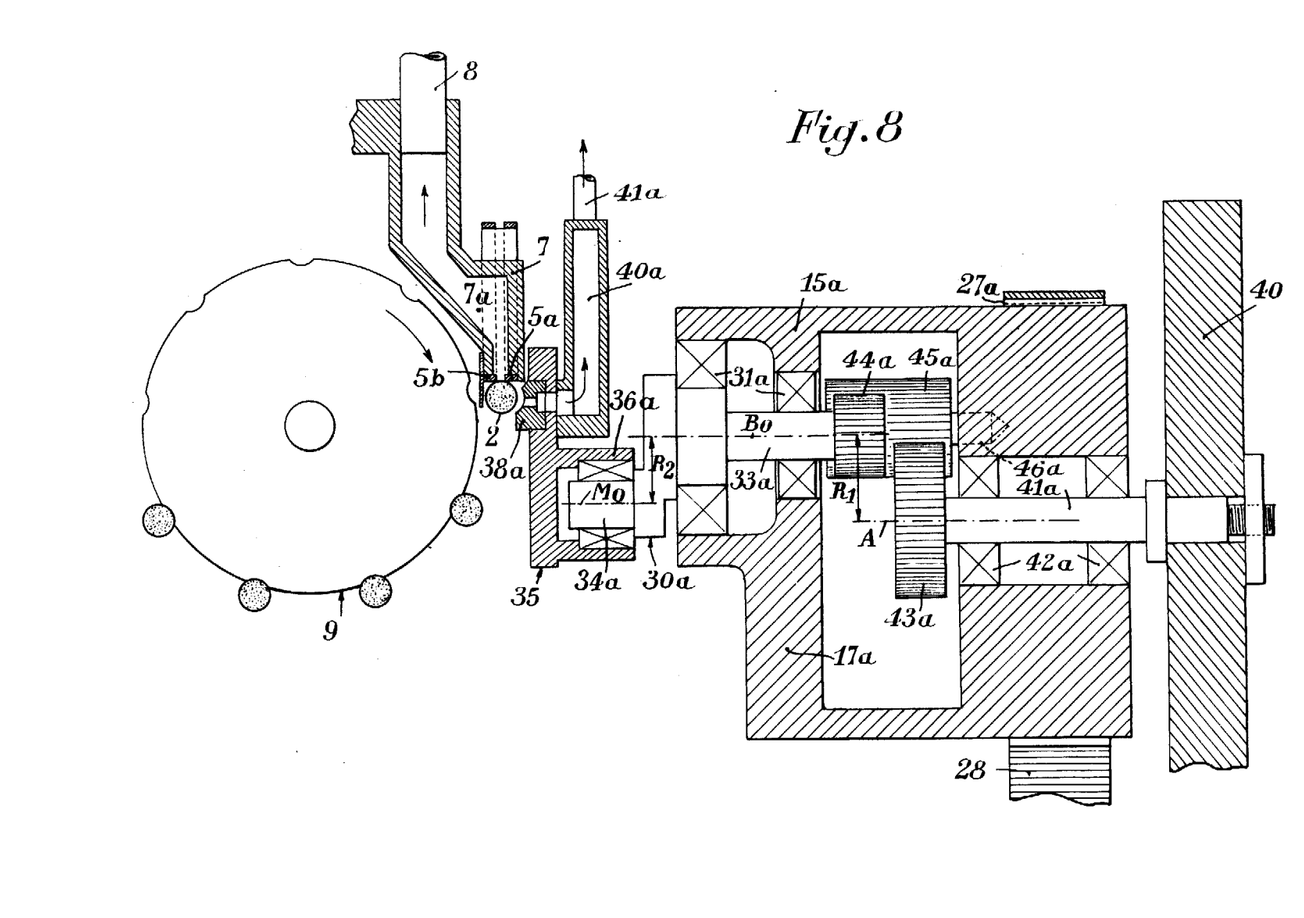
FIG. 8 is a section taken along the line VIII-VIII of FIG. 7.

In the modified embodiment illustrated in FIGS. 7 and 8 the difference with the preceding example resides in the kind of mechanical means implemented for imparting an elliptic motion to the pick-up plate 35. Therefore, only the elements by which this modified structure differs from one illustrated in FIGS. 1–3 will be described hereinafter in detail, the other elements being designated in FIGS. 7 and 8 by the same reference symbols as the homologue elements illustrated in said FIGS. 1–3.

In the assembly shown in FIGS. 7 and 8 the casing 14 (FIGS. 1 and 2) is eliminated but a vertical support 40 parallel to the horizontal conveyor 4 is provided secured to this vertical support 40 are the first ends of a pair of fixed shafts 41a and 41b receiving intermediate their ends the rear bores of casings 15a and 15b with the interposition of suitable ball-bearings such as 42a. Wedged to the other or second ends of these fixed shafts 41a, 41b are the hubs of fixed pinions 43a 43b, respectively, having each an even number of teeth 2N.

As in the above-described form of embodiment shown in FIGS. 1–3, the main shafts or axes 33a and 33b of the pair of crankshafts 30a and 30b are rotatably mounted, respectively, by means of ball-bearings such as 31a (FIG. 8) in eccentric bores formed in plates such as 17a constituting closing covers on the side of rotary casings 15a and 15b which registers with the pick-up plate 35. Keyed or wedged to the end of the shafts, for example shaft 33a, of each crankshaft 30a, 30b, is a pinion 44a having one-half of the teeth number of pinion 43a i.e. N, but with the same teeth outline and pitch. The assembly is so disposed that the pair of pinions 43a and 44a are in constant lateral meshing engagement with a third fixed pinion 45a (FIG. 8) mounted for loose rotation on a shaft 46a secured to an inner wall of said rotary casing 15a, this third pinion 45a having the same teeth outline as the pair of pinions 43a and 44a. Wedged to the outer peripheral cylindrical surface of the casings 15a and 15b are toothed rings such as 27a (FIG. 8) so that both casings 15a and 15b can be driven for rotation in the same direction and, at the same speed, by means of a cogged belt 28 driven in turn by means of a notched pulley 29 wedged to one end of a power shaft 47 rotatably mounted in a bearing 48 rigid with the vertical support 40.

The power shaft 47 is rotatably driven from the power mechanism already mentioned hereinabove via transmission means providing a ratio selected to cause the rotary casings 15a and 15b to accomplish a complete revolution about the fixed shafts 41a and 41b during the time necessary bringing two cigarettes at the level of drum 9 on the horizontal conveyor 4. Under these conditions, it is clear that the axes M of the pair of crankpins of both crankshafts 30a and 30b, and consequently also the receptacles 38a and 38b of pick-up plate 35, are driven to perform elliptic movements such as described in the foregoing with reference to the diagram of FIG. 4; in fact, while each rotary casing such as 15a rotatably drives about the corresponding shaft 41a the main shaft 33a of crankshaft 30a together with the shaft 46a of pinion 45a in the clockwise direction, at an angular velocity ω, pinion 45a imparts to pinion 44a and consequently to shaft 33a of crankshaft 30a a movement of rotation in relation to the casing 15a in a counter-clockwise direction, since the teeth ratio of pinions 43a and 44a is 2; in other words, with the relationships illustrated in FIG. 4 when the radius AB fixed in relation to the rotary casing 15a is inclined by an angle α to the vertical, the crankshaft 30a forms en angle −2 α with said radius AB, as clearly shown in the diagram of FIG. 4.

Now the present invention should not be construed as being strictly limited by the specific forms of embodiment described hereinabove, since it also includes all possible forms of embodiment of the means for imparting a proper motion to the pick-up head, notably the pick-up plate, so that its closed-circuit path be an ellipse having it major axis disposed horizontally.

What is claimed as new is:

1. Device for collecting cigarettes or similar elongated objects, notably for transferring from a horizontal conveyor to a collector drum rotatably mounted about an axis parallel to said conveyor, which comprises a movable pick-up head and means for moving said pick-up head along an elliptic path tangent to said conveyor, at the level of a pick-up station and positioned in a vertical plane which is also substantially tangent to said collector drum at the level of a distributing station, said elliptic path having a horizontal major axis and one apex of the minor axis located at said pick-up station and one apex of the major axis located at said distributing station, said means for moving said pick-up head being so arranged as to impart thereto, at the apices of its minor axis, a linear velocity parallel and equal to that of said cigarettes travelling on said conveyor, and at the apices of its major axis, a linear velocity parallel and equal to the peripheral velocity of said collector drum, and said pickup-head comprising in said vertical plane tangent to said collector drum a pick-up plate provided with at least one cigarette receptacle, a pair of identical crankshafts having their axes perpendicular to said vertical plane, said pick-up plate being pivotally mounted on the crank arms of said crankshafts, driving means being provided for simultaneously rotating the shaft of each crankshaft with a predetermined throw about a fixed axis perpendicular to said vertical plane, and its crank arm with another predetermined throw about the shaft of said crankshaft, with equal velocities of rotation but in opposite directions, whereby the cigarette receptacle of said pick-up plate is constantly maintained in a horizontal position at all points of its elliptic path.

2. Device according to claim 1, wherein said shafts of the crankshafts are rotatably mounted eccentrically on casing plates also rotatably mounted, to which synchronous movements of rotation about fixed axes parallel to those of said crankshafts, and positioned in a same horizontal plane, are imparted.

3. Device according to claim 2, wherein another shaft coaxial with each casing plate and driven in turn at a rotational velocity equal and opposite to that of said casing plate is connected to each said shaft of the corresponding crankshaft by means of a double universal coupling.

4. Device according to claim 2, wherein a first fixed pinion having a predetermined number of teeth and coaxial to each casing plate and a second pinion having one half said predetermined number of teeth and carried by said shaft of the corresponding crankshaft are operatively interconnected by a third pinion rotatably mounted on said casing plate.

5. Device according to claim 1 wherein said pick-up plate has formed therethrough at the level of each said cigarette receptacle a suction port communicating with a source of vacuum only at the level of said pick-up station and on the portion of its elliptic path which extends between said pick-up station and said distributing station.

* * * * *